United States Patent
Horng et al.

(10) Patent No.: US 6,806,598 B1
(45) Date of Patent: Oct. 19, 2004

(54) DOUBLE-PHASE HALF-WAVE BRUSHLESS DC MOTOR HAVING TWO SENSOR/DRIVE MEMBERS

(75) Inventors: Alex Horng, Kaohsiung (TW); Ching-Sheng Hong, Kaohsiung (TW); Ta-Lun Ko, Kaohsiung Hsien (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 0 days.

(21) Appl. No.: 10/622,699

(22) Filed: Jul. 21, 2003

(30) Foreign Application Priority Data

May 23, 2003 (TW) .......................................... 92114072

(51) Int. Cl.$^7$ .............................................. H02K 11/00
(52) U.S. Cl. ................. 310/67 R; 310/68 R; 310/68 B; 310/71; 310/179; 310/180
(58) Field of Search ............................. 310/68 R, 67 R, 310/71, 179, 180, 68 B

(56) References Cited

U.S. PATENT DOCUMENTS

| | | | |
|---|---|---|---|
| 4,800,307 A | * | 1/1989 | Papst ....................... 310/67 R |
| 5,731,645 A | * | 3/1998 | Clifton ........................ 310/74 |
| 5,821,674 A | * | 10/1998 | Weiner ..................... 310/68 D |
| 5,828,147 A | * | 10/1998 | Best ............................ 310/71 |
| 6,727,613 B2 | * | 4/2004 | Kawakami et al. ....... 310/75 R |

\* cited by examiner

Primary Examiner—Thomas M. Dougherty
Assistant Examiner—Iraj A. Mohandesi
(74) Attorney, Agent, or Firm—Bacon & Thomas, PLLC

(57) ABSTRACT

A double-phase half-wave brushless dc motor in accordance with the present invention includes a first sensor/drive member, a second sensor/drive member, a first motor coil and a second motor coil. Each of the sensor/drive members has two pins for electrical connection. Each of the motor coils is consisted of a first terminal and a second terminal for electrical connection. The first terminals of the first and second motor coils are commonly connected to a power source. The second terminal of the first motor coil is connected to one of the pins of the first sensor/drive member and one of the pins of the second sensor/drive member in common. And, the second terminal of the second motor coil is connected to the other pin of the first sensor/drive member and the other pin of the second sensor/drive member in common.

4 Claims, 2 Drawing Sheets

DOUBLE-PHASE HALF-WAVE BRUSHLESS DC MOTOR HAVING TWO SENSOR/DRIVE MEMBERS

BACKGROUND OF THE INVENTION

1. Field of the Invention

The present invention is related to a double-phase half-wave brushless dc motor having two sensor/drive members. More particularly, the present invention is related to using two sensor/drive members to control a double-phase half-wave coil assembly of the brushless dc motor.

2. Description of the Related Art

Referring initially to FIG. 1, it illustrates a schematic circuitry of a conventional double-phase half-wave brushless dc motor. The double-phase half-wave brushless dc motor has a drive circuit 10 for driving a double-phase half-wave coil assembly. The drive circuit 10 includes a sensor/drive member 11 and two coils 12. The sensor/drive member 11 has two pins O1 and O2 for electrical connection, thereby connecting to the two coils 12. In function, the sensor/drive member 11 is applied to alternatively turning on or off for controlling the coil 12. Thereby, the sensor/drive member 11 is in control of conducting or cutting off the coil 12. Consequently, the two excited coils 12 are capable of rotating a motor rotor.

However, the rated power characteristic of the sensor/drive member 11 is changed nonlinear with respect to its dimensions. In other words, if the rated power of the sensor/drive member 11 is doubled, the dimensions have an increase of more than double. Thus, the increase of the rated power of the sensor/drive member 11 must result in an extra-occupation in an inner space of the motor.

Moreover, a large rated power of the sensor/drive member 11 must result in an increase of manufacturing cost. That is, the manufacturing cost of a double rated power of the sensor/drive member 11 must be more expensive than that of two regular rated power of the sensor/drive member 11.

In order to save the inner space and to reduce manufacturing cost of the motor, an additional sensor/drive member is added into the motor. Consequently, the motor accomplishes a double increase in rated power and a reduction in manufacturing cost.

The present invention intends to provide a double-phase half-wave brushless dc motor having two sensor/drive members for controlling a double-phase half-wave coil assembly, each of the sensor/drive members provided with a small rated power. Due to the small dimensions and the low manufacturing cost, the small rated power of the sensor/drive members substitute for a large rated power of the sensor/drive member that may enhance the rated power, minimize the dimensions and reduce the manufacturing cost. In manufacture, maximum number of the sensor/drive members of the motor is equal to or less than number of poles.

SUMMARY OF THE INVENTION

The primary objective of this invention is to provide a double-phase half-wave brushless dc motor having two sensor/drive members, each of which has small rated power adapted to control a double-phase half-wave coil assembly. Thereby, the two sensor/drive members may enhance the rated power of the double-phase half-wave brushless dc motor.

The secondary objective of this invention is to provide the double-phase half-wave brushless dc motor having two sensor/drive members, which have small dimensions and low manufacturing cost. Thereby, the two sensor/drive members may minimum the dimensions and lower the manufacturing cost of the double-phase half-wave brushless dc motor.

The double-phase half-wave brushless dc motor in accordance with the present invention includes a first sensor/drive member, a second sensor/drive member, a first motor coil and a second motor coil. Each of the sensor/drive members has two pins for electrical connection. Each of the motor coils is consisted of a first terminal and a second terminal for electrical connection. The first terminals of the first and second motor coils are commonly connected to a power source. The second terminal of the first motor coil is connected to one of the pins of the first sensor/drive member and one of the pins of the second sensor/drive member in common. And, the second terminal of the second motor coil is connected to the other pin of the first sensor/drive member and the other pin of the second sensor/drive member in common.

Other objectives, advantages and novel features of the invention will become more apparent from the following detailed description and the accompanying drawings.

BRIEF DESCRIPTION OF THE DRAWINGS

The present invention will now be described in detail with reference to the accompanying drawings herein.

DETAILED DESCRIPTION OF THE INVENTION

Figure 1:
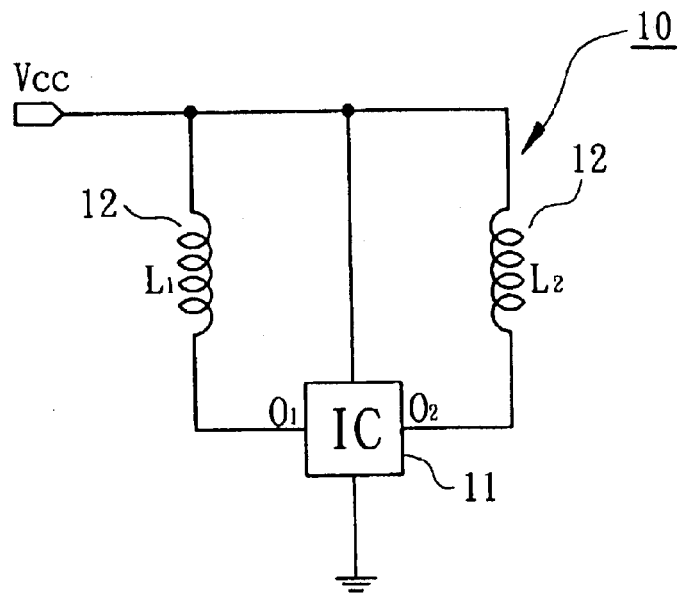
FIG. 1 is a schematic circuitry of a conventional double-phase half-wave brushless dc motor in accordance with the prior art.

Referring now to the drawings, there are two embodiments of the present invention shown therein.

Figure 2:
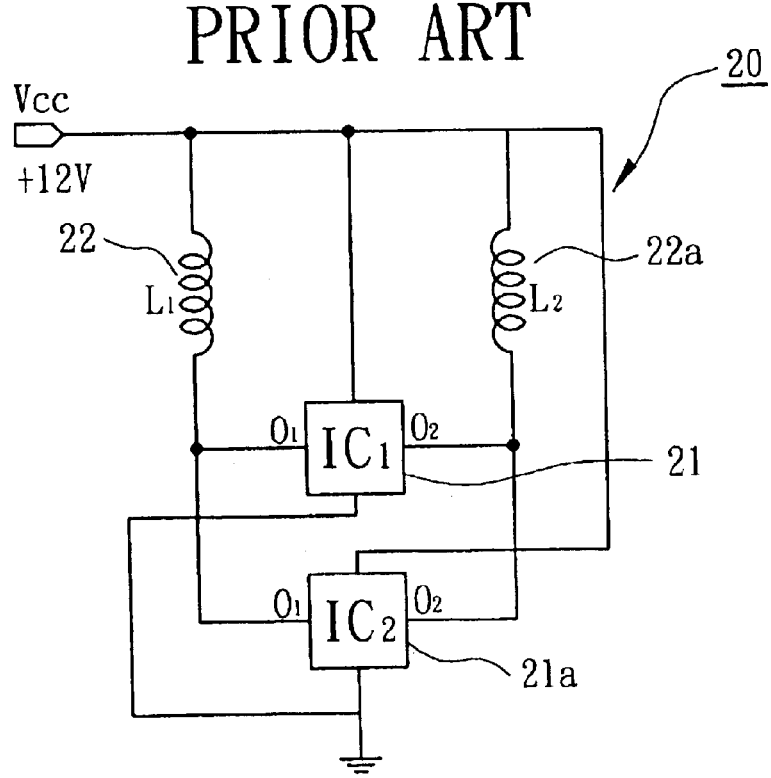
FIG. 2 is a schematic circuitry of a double-phase half-wave brushless dc motor having two sensor/drive members in accordance with a first embodiment of the present invention.
Figure 3:
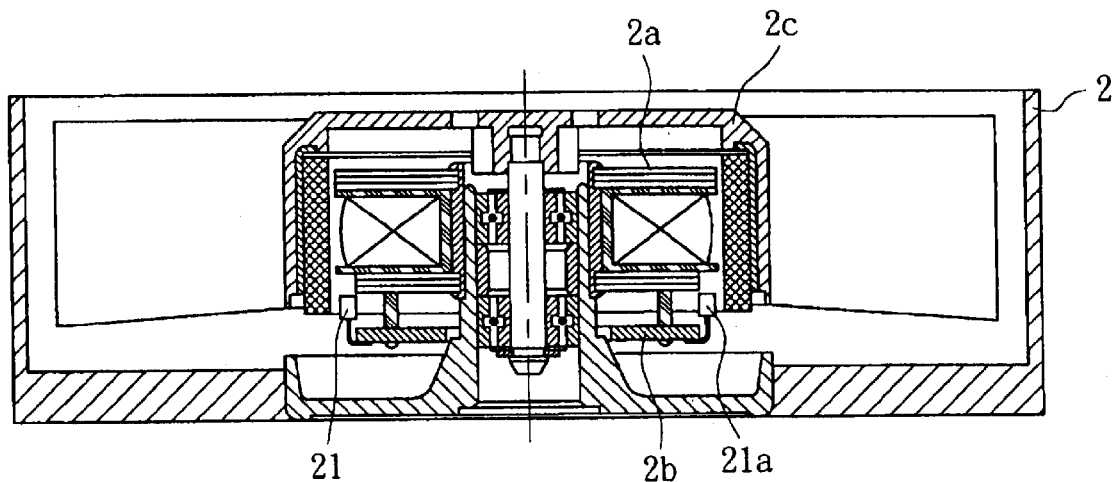
FIG. 3 is a cross-sectional view of the double-phase half-wave brushless dc motor having two sensor/drive members in accordance with the first embodiment of the present invention.

FIG. 2 illustrates a schematic circuitry of a double-phase half-wave brushless dc motor having two sensor/drive members in accordance with a first embodiment of the present invention. FIG. 3 illustrates a cross-sectional view of a circuit board of the double-phase half-wave brushless dc motor mounting two sensor/drive members in accordance with the first embodiment of the present invention.

Referring to FIGS. 2 and 3, a double-phase half-wave brushless dc motor 2 in accordance with a first embodiment of the present invention has a drive circuit 20 for driving a double-phase half-wave coil assembly. The drive circuit 20 includes a first sensor/drive member 21, a second sensor/drive member 21a, a first motor coil 22 and a second motor coil 22a.

Construction of the drive circuit 20 of the double-phase half-wave brushless dc motor shall be described in detail, referring back to FIG. 2. Each of the sensor/drive members 21 and 21a has a first pin O1 and a second pin O2 for electrical connection. Preferably, the rated power of the first sensor/drive member 21 is identical with that of the second sensor/drive member 21a. Each of the motor coils 22 and 22a is consisted of a first terminal and a second terminal for electrical connection. Preferably, the impedance of the first motor coil 22 is identical with that of the second motor coil 22a.

Referring back to FIG. 3, the double-phase half-wave brushless dc motor includes a motor stator 2a, a circuit board 2b and a motor rotor 2c. The drive circuit (not shown) is disposed and incorporated into the circuit board 2b which is adapted to mount the first sensor/drive member 21 and the second sensor/drive member 21a. In operation, the first sensor/drive member 21 and the second sensor/drive member 21a are able to detect a rotation of a permanent magnet of the motor rotor 2c.

Referring again to FIG. 3, in assembling, on the circuit board 2b, the first sensor/drive member 21 and the second sensor/drive member 21a can be chosen to position proximate two same pole phases of a serial alternative magnetic poles of the motor stator 2a. Namely, a first pole of the motor stator 2a adjacent to the first sensor/drive member 21 generates a magnetic field identical to that generated by a second pole of the motor stator 2a adjacent to the second sensor/drive member 21a. Alternatively, the first sensor/drive member 21 and the second sensor/drive member 21a can be positioned at two different pole phases of the serial alternative magnetic poles of the motor stator 2a. Namely, a first pole of the motor stator 2a adjacent to the first sensor/drive member 21 generates a magnetic field opposite to that generated by a second pole of the motor stator 2a adjacent to the second sensor/drive member 21a.

Referring again to FIG. 2, the first terminals of the first and second motor coils 22 and 22a are commonly connected with a power source (Vcc). Further, the second terminal of the first motor coil 22 is connected to the first pin O1 of the first sensor/drive member 21 and the first pin O1 of the second sensor/drive member 21a in common. And, the second terminal of the second motor coil 22a is connected to the second pin O2 of the first sensor/drive member 21 and the second pin O2 of the second sensor/drive member 21a in common.

This preferred connection design of the first sensor/drive member 21 and the second sensor/drive member 21a is corresponding to the same pole phase of the serial alternative magnetic poles of the motor stator 2a. Consequently, the first sensor/drive member 21 and the second sensor/drive member 21a accomplish detection of the same pole phase (N pole or S pole) of the permanent magnet of the motor rotor 2c.

In rotational operation, the first sensor/drive member 21 and the second sensor/drive member 21a are adapted to detect the same pole phase (N pole or S pole) of the permanent magnet of the motor rotor 2c synchronously. For example, the first sensor/drive member 21 and the second sensor/drive member 21a can commonly obtain N pole or S pole of the motor rotor 2c. Thereby, the first pins O1 and the second pins O2 of the first sensor/drive member 21 and the second sensor/drive member 21a are alternatively turned on or off so that the first motor coil 22 and the second motor coil 22a are alternatively excited.

Once the first motor coil 22 is conducted through the first pins O1 of the first and second sensor/drive member 21 and 21a, the second motor coil 22a is cut off on the second pins O2 of the first and second sensor/drive member 21 and 21a. Contrarily, once the second motor coil 22a is conducted through the second pins O2 of the first and second sensor/drive member 21 and 21a, the first motor coil 22 is cut off on the first pins O1 of the first and second sensor/drive member 21 and 21a.

When the first motor coil 22 is conducted through the first pins O1 of the first and second sensor/drive member 21 and 21a, two currents may pass through the two first pins O1 of the first and second sensor/drive member 21 and 21a that may result in an increase of rated power. For example, a single sensor/drive member has 500 mW rated power and 700 mA rated current, and the two sensor/drive members have brought up to 1000 mW rated power and 1400 mA rated current. Similarly, when the second motor coil 22s is conducted through the second pins O2 of the first and second sensor/drive member 21 and 21a, two currents may pass through the two second pins O2 of the first and second sensor/drive member 21 and 21a that may also result in an increase of rated power.

Referring again to FIGS. 1 and 2, to increase rated power of the motor, the conventional drive circuit 10 must use a large sensor/drive member 11 that may result in an increase of dimensions and manufacturing cost. By contrast, the drive circuit 20 applies a small sensor/drive member 21 and an additional small sensor/drive member 21a that may result in a reduction of dimensions and manufacturing cost.

Figure 4:
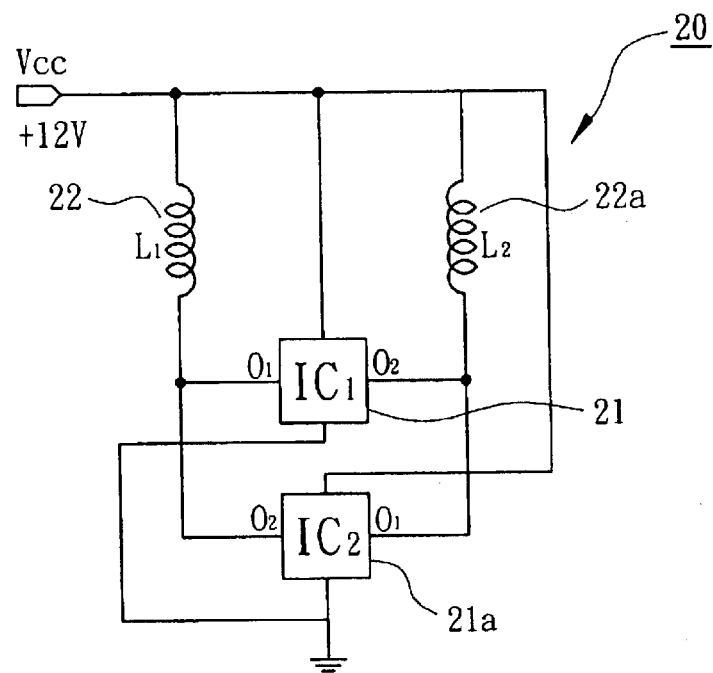
FIG. 4 is a schematic circuitry of a double-phase half-wave brushless dc motor having two sensor/drive members in accordance with a second embodiment of the present invention.

FIG. 4 illustrates a cross-sectional view of a circuit board of a double-phase half-wave brushless dc motor mounting two sensor/drive members in accordance with the second embodiment of the present invention.

Referring to FIG. 4, reference numerals of the second embodiment has applied the identical numerals of the first embodiment. The double-phase half-wave brushless dc motor of the second embodiment has the similar configuration and same function as that of the first embodiment and the detailed descriptions are omitted.

Referring again to FIGS. 3 and 4, in comparison with the first embodiment, on the circuit board 2b of the second embodiment, the first sensor/drive member 21 and the second sensor/drive member 21a can be positioned at two different pole phases of the serial alternative magnetic poles of the motor stator 2a. Consequently, the first sensor/drive member 21 and the second sensor/drive member 21a accomplish detection of the different pole phases (N pole and S pole; or S pole and N pole) of the permanent magnet of the motor rotor 2c.

Referring again to FIG. 4, the first terminals of the first and second motor coils 22 and 22a are commonly connected with a power source (Vcc). In comparison with the first embodiment, the second terminal of the first motor coil 22 of the second embodiment is connected to the first pin O1 of the first sensor/drive member 21 and the second pin O2 of the second sensor/drive member 21a in common. Similarly, the second terminal of the second motor coil 22a is connected to the second pin O2 of the first sensor/drive member 21 and the first pin O1 of the second sensor/drive member 21a in common.

In rotational operation, the first sensor/drive member 21 and the second sensor/drive member 21a are adapted to detect the different pole phases of the permanent magnet of the motor rotor 2c synchronously. For example, when the first sensor/drive member 21 obtains N pole of the motor rotor 2c, the second sensor/drive member 21a may obtain S pole of the motor rotor 2c. Contrarily, when the first sensor/drive member 21 obtains S pole of the motor rotor 2c, the second sensor/drive member 2a may obtain N pole of the motor rotor 2c. Thereby, a first pin set and a second pin set of the first sensor/drive member 21 and the second sensor/drive member 21a are alternatively turned on or off so that the first motor coil 22 and the second motor coil 22a are alternatively excited. The first pin set is consisted of the first pin O1 of the first sensor/drive member 21 and the second pin O2 of the second sensor/drive member 21a. Alternatively, the second pin set is consisted of the second pin O2 of the first sensor/drive member 21 and the first pin O1 of the first pin O2 of the second sensor/drive member 21a.

Once the first motor coil 22 is conducted through the first pin O1 of the first sensor/drive member 21 and the second pin O2 of the sensor/drive member 21a, the second motor coil 22a is cut off. Contrarily, once the second motor coil 22a is conducted through the second pin O2 of the first sensor/drive member 21 and the first pin O1 of the second sensor/drive member 21a, the first motor coil 22 is cut off.

When the first motor coil 22 is conducted through the first pin O1 of the first sensor/drive member 21 and the second pin O2 of the second sensor/drive member 21a, two currents may pass through the first and second sensor/drive member 21 and 21a that may result in an increase of rated power. Similarly, when the second motor coil 22s is conducted through the second pin O2 of the first sensor/drive member 21 and the first pin O1 of the second sensor/drive member 21a, two currents may pass through the first and second sensor/drive member 21 and 21a that may also result in an increase of rated power.

Although the invention has been described in detail with reference to its presently preferred embodiment, it will be understood by one of ordinary skill in the art that various modifications can be made without departing from the spirit and the scope of the invention, as set forth in the appended claims.

What is claimed is:

1. A brushless dc motor, comprising:

a motor rotor having at least one magnet set;

a motor stator having at least one pole set corresponding to the magnet set of the motor rotor;

a first sensor/drive member having a first pin and a second pin, the first sensor/drive member is adapted to detect pole phases of the magnet set of the motor rotor;

a second sensor/drive member having a first pin and a second pin, the second sensor/drive member is adapted to detect pole phases of the magnet set of the motor rotor;

a first motor coil having a first terminal and a second terminal, and the first terminal is connected to a power source while the second terminal is connected to one of the first and second pins of the first sensor/drive member and one of the first and second pins of the second sensor/drive member in common; and a second motor coil having a first terminal and a second terminal, and the first terminal is connected to the power source while the second terminal is connected to the other of the first and second pins of the first sensor/drive member and the other of the first and second pins of the second sensor/drive member;

wherein the first sensor/drive member and the second sensor/drive member are commonly detect the pole phases of the magnet set of the motor rotor so that the first motor coil and the second motor coil are alternatively excited to thereby rotate the motor rotor.

2. The brushless dc motor as defined in claim 1, further comprising a circuit board attached to a bottom portion of the motor rotor; the first sensor/drive member and the second sensor/drive member are mounted to the circuit board.

3. The brushless dc motor as defined in claim 2, wherein the first sensor/drive member and the second sensor/drive member are located at the same pole phases of the pole set of the motor stator.

4. The brushless dc motor as defined in claim 2, wherein the first sensor/drive member and the second sensor/drive member are located at the different pole phases of the pole set of the motor stator.

* * * * *